(12) United States Patent
Wu et al.

(10) Patent No.: US 9,134,776 B2
(45) Date of Patent: Sep. 15, 2015

(54) DEVICE IN COMPUTER SYSTEM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kang Wu, Shenzhen (CN); Bo Tian, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 289 days.

(21) Appl. No.: 13/902,868

(22) Filed: May 27, 2013

(65) Prior Publication Data
US 2014/0164754 A1 Jun. 12, 2014

(30) Foreign Application Priority Data
Dec. 11, 2012 (CN) .......................... 2012 1 0530167

(51) Int. Cl.
*G06F 1/24* (2006.01)
*G06F 13/00* (2006.01)
*G06F 9/44* (2006.01)

(52) U.S. Cl.
CPC *G06F 1/24* (2013.01); *G06F 13/00* (2013.01); *G06F 9/4411* (2013.01)

(58) Field of Classification Search
CPC .............................. G06F 9/4411; G06F 9/4401
See application file for complete search history.

(56) References Cited

U.S. PATENT DOCUMENTS

2008/0189782 A1* 8/2008 Broyles .......................... 726/16
2012/0117366 A1* 5/2012 Luo ................................. 713/2

OTHER PUBLICATIONS

Intel 82599 10 GbE Controller Datasheet, Feb. 2015, Section 4.5.2—BIOS disable of the Device at Boot Time by Using the Strapping Option, p. 163.*

* cited by examiner

*Primary Examiner* — Jaweed A Abbaszadeh
*Assistant Examiner* — Gary Collins
(74) *Attorney, Agent, or Firm* — Novak Druce Connolly Bove + Quigg LLP

(57) ABSTRACT

A device includes a PCH including a reset control pin and a disable control pin. A BIOS chip to control the PCH to send a low logic level from the reset control pin to the reset pin to reset a Ethernet controller. A timing adjusting circuit and the Ethernet controller. The Ethernet controller includes a reset pin and a disable pin, the reset pin is connected to the reset control pin via the timing adjusting circuit, and the disable pin is connected to the disable control pin via the timing adjusting circuit. The PCH sends a low logic level from the disable control pin to the disable pin to disable the Ethernet controller, and the timing adjusting circuit delays the low logic level, which makes the low logic level of the disable pin come later than the high logic level of the reset pin.

4 Claims, 1 Drawing Sheet

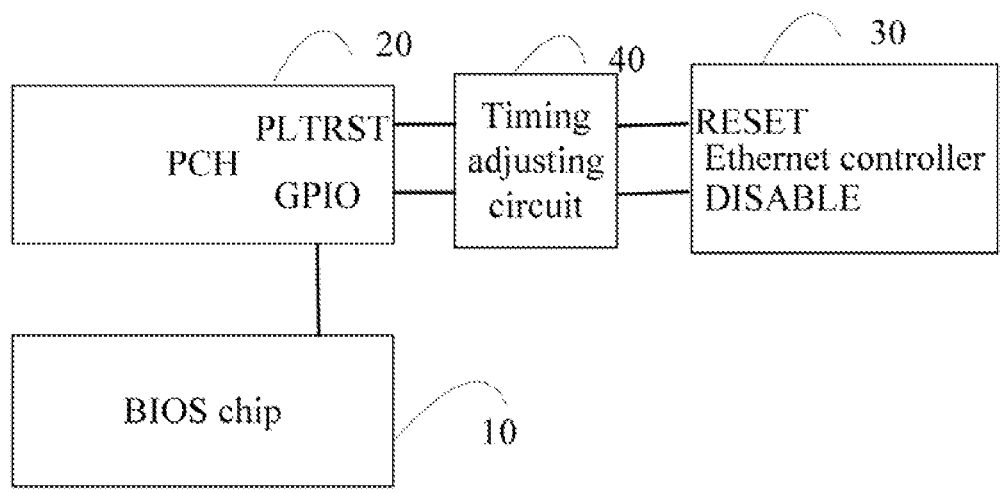

DEVICE IN COMPUTER SYSTEM

BACKGROUND

1. Technical Field

The present disclosure relates to devices in computer systems, and particularly to an device for enabling a disable function of an Ethernet controller.

2. Description of Related Art

Ethernet controllers are widely used in computer systems. The Ethernet controller typically has a reset pin and a disable pin. The reset pin is connected to a reset control pin of a platform controller hub (PCH) and the disable pin is connected to a disable control pin, such as a general purpose input/output (GPIO) pin, of the PCH. At the end of booting of the computer system, a basic input/output system (BIOS) chip controls the PCH to send a low logic level from the reset control pin to the reset pin, thus resetting and thus enabling the Ethernet controller to properly work. After the booting, in response user inputs, the BIOS chip may control the PCH to send a low logic level from the GPIO pin to the disable pin to disable the Ethernet controller. The computer system will save the low logic level in the BIOS chip. Thus, when the computer system restarts, the low logic level of the disable pin is detected earlier than high logic level of the reset pin, the Ethernet controller may not properly detect the low logic level of the disable pin, which makes the disable function of the Ethernet controller not work.

Therefore, it is desirable to provide an device for enabling a disable function of an Ethernet controller.

BRIEF DESCRIPTION OF THE DRAWINGS

The drawing is a functional block diagram of a device, according to an embodiment.

DETAILED DESCRIPTION

Embodiments of the disclosure will be described with reference to the accompanying drawings.

The drawing shows a device according to an embodiment. The device includes a BIOS chip 10, a PCH 20, an Ethernet controller 30, and a timing changing circuit 40. The PCH 20 includes a reset control pin "PLTRST" and a disable control pin "GPIO". The Ethernet controller 30 includes a reset pin "RESET" and a disable pin "DISABLE". The reset pin "RESET" is connected to the reset control pin "PLTRST" via the timing adjusting circuit 40, and the disable pin "DISABLE" is connected to the disable control pin "GPIO" via the timing adjusting circuit 40.

The BIOS chip 10 is connected to the PCH 20. The BIOS chip 10 is configured to control the PCH 20 to send a low logic level from the reset control pin "PLTRST" to the reset pin "RESET" to reset the Ethernet controller 30 during booting of the device. The PCH 20 is also controlled to send a low logic level from the disable control pin "GPIO" to the disable pin "DISABLE" to disable the Ethernet controller 30 after the booting and in response to user inputs.

The timing adjusting circuit 40 is configured to delay the low logic level, which makes the low logic level of the disable pin come later than the high logic level of the reset pin.

In a better embodiment, the timing adjusting circuit 40 may be a programmable component, such as a EPM3032ATC44-10N. The Ethernet controller 30 may be a 82599 chip.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A device comprising:
   a platform controller hub PCH comprising a reset control pin and a disable control pin;
   a basic input/output system BIOS chip, connected to the PCH, to control the PCH to send a low logic level from the reset control pin to the reset pin to reset a Ethernet controller during booting of the device;
   a timing adjusting circuit; and
   the Ethernet controller, comprising a reset pin and a disable pin, the reset pin connected to the reset control pin via the timing adjusting circuit, and the disable pin connected to the disable control pin via the timing adjusting circuit;
   wherein the PCH is further controlled to send a low logic level from the disable control pin to the disable pin to disable the Ethernet controller during booting of the device, and the timing adjusting circuit is configured to delay the low logic level, which makes the low logic level of the disable pin come later than the high logic level of the reset pin.

2. The device according to claim 1, wherein the timing adjusting circuit is a programmable component.

3. The device according to claim 2, wherein the timing adjusting circuit is a EPM3032ATC44-10N.

4. The device according to claim 1, wherein the Ethernet controller is a 82599 chip.

* * * * *